Aug. 4, 1942.　　　　D. SAMIRAN　　　　2,291,653
FUEL SYSTEM HAVING A FUEL PRESSURE REGULATOR
Original Filed March 13, 1939　　2 Sheets-Sheet 1
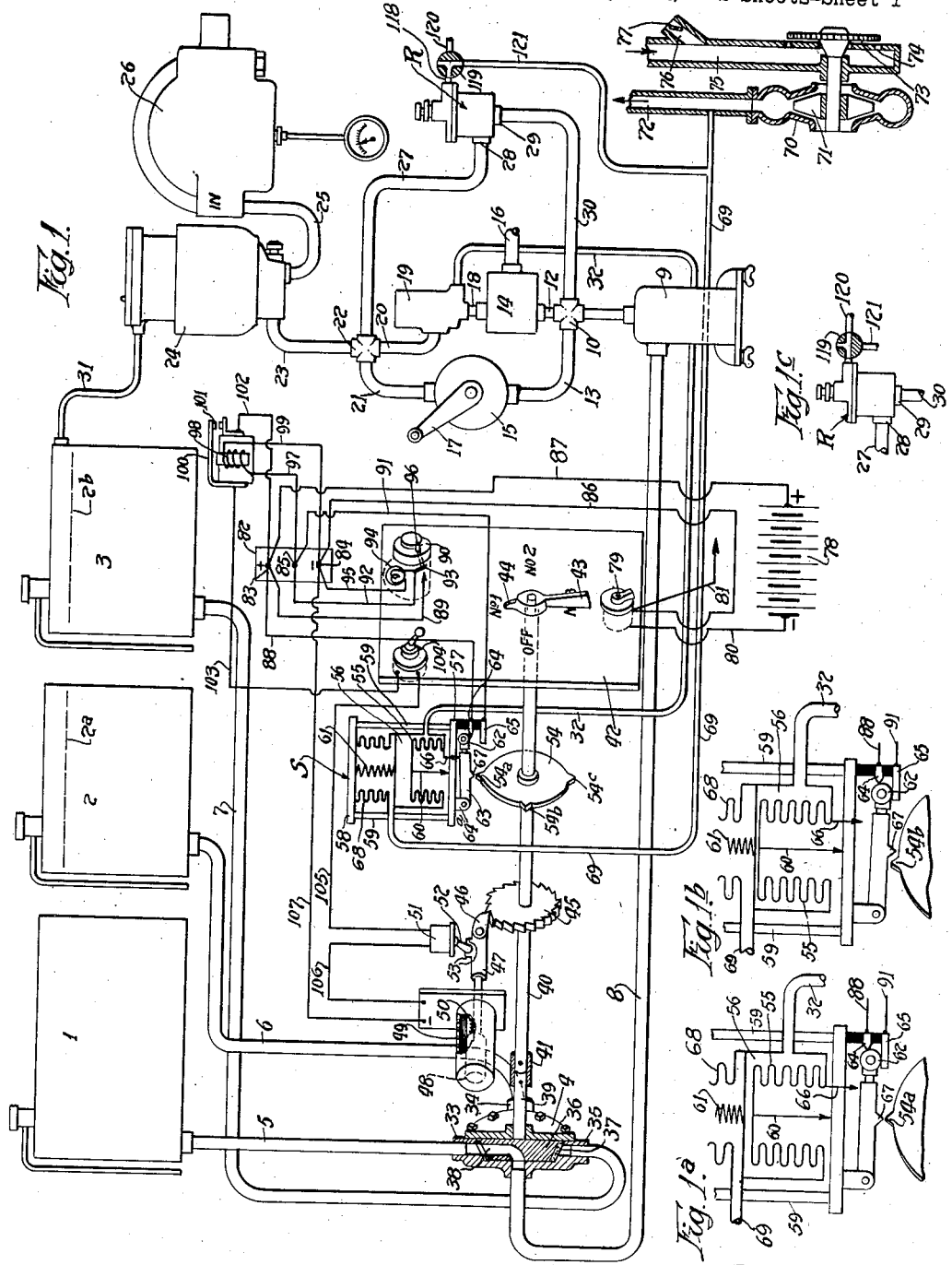
Witness:
E. Camporini
Inventor:
David Samiran,
By: Edgar H. Dodge and
Wade Koontz
Attorneys.

Aug. 4, 1942.     D. SAMIRAN     2,291,653
FUEL SYSTEM HAVING A FUEL PRESSURE REGULATOR
Original Filed March 13, 1939    2 Sheets-Sheet 2
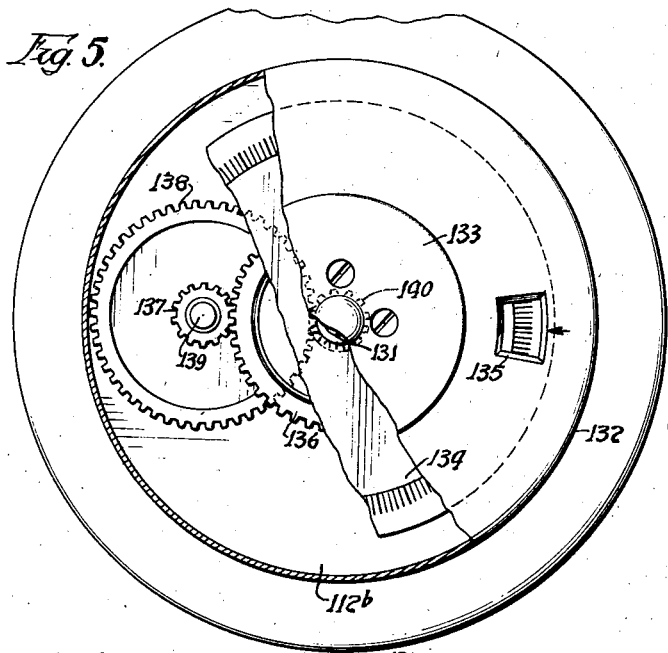
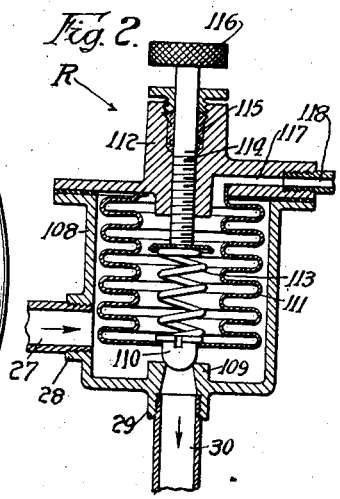
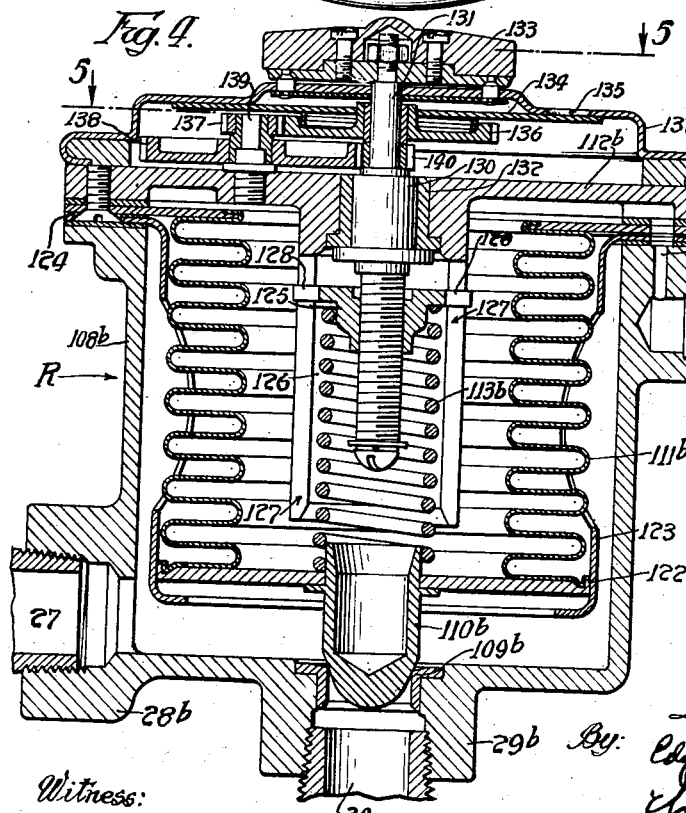
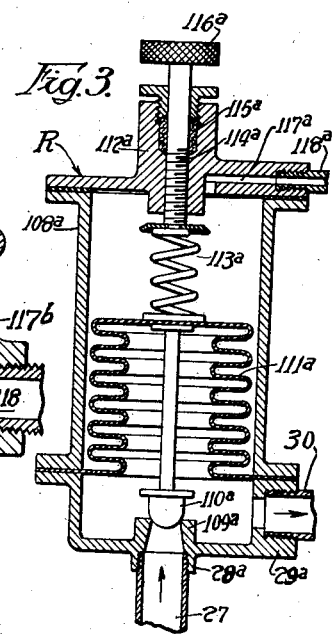
Inventor:
David Samiran, Patented Aug. 4, 1942

2,291,653

UNITED STATES PATENT OFFICE 2,291,653

FUEL SYSTEM HAVING FUEL PRESSURE REGULATORS

David Samiran, Fairfield, Ohio

Original application March 13, 1939, Serial No. 261,542. Divided and this application August 13, 1940, Serial No. 352,426

9 Claims. (Cl. 123—119)

(Granted under the act of March 3, 1883, as amended April 30, 1928; 370 O. G. 757)

The invention described herein may be manufactured and used by or for the Government for governmental purposes without the payment to me of any royalty thereon.

The present invention relates in general to fuel systems provided with a plurality of separate fuel sources in which the contents of fuel containers representative of such fuel sources are automatically connected in predetermined order to a source of fuel consumption, the present application being a division of my copending application, Serial No. 261,542.

One object of the present invention is to provide in a fuel system of the general character just mentioned, a fuel pressure regulator which is so designed and associated with the fuel system that it effects efficient operation thereof, particularly when a selector valve of the fuel system is approaching port alignment position and the supply of fuel to the fuel pump is therefore restricted, the fuel pressure regulator being comparatively simple and inexpensive from a manufacturing standpoint.

A further object is to provide the fuel pressure regulator with pressure responsive means connected with atmosphere so as to be responsive to variations in atmospheric pressure, as when the fuel system is used in connection with an airplane operating at different altitudes or, in the event that the airplane engine is provided with a supercharger, then the pressure responsive means of the fuel pressure regulator is connected with the discharge of the supercharger for the purpose of compensating the fuel pressure regulator action in response to the substantially constant air under pressure supplied to the intake of the engine by the supercharger.

Still a further object is to provide in a fuel system for an engine having a supercharger and a fuel pressure responsive switch for effecting operation of a selector valve, a fuel pressure regulator connected between the outlet and the inlet of the fuel pump and both the fuel pressure switch and the fuel pressure regulator having supercharger connections for compensating the action of the fuel pressure regulator and the fuel pressure switch in accordance with the operation of the supercharger.

Still another object is to provide a fuel pressure regulator having a valve member which is resiliently closed and in which pressure responsive means acting in response to fuel pressure built up in the fuel pressure regulator opens the valve and thereby permits sufficient fuel to bypass back to the intake of the pump for the purpose of maintaining a substantially constant outlet pressure in the pump, the pressure responsive means responding to the fuel pressure in such manner as to move the valve toward closed position upon a drop of fuel pressure as caused by a faltering fuel supply to the fuel pump, thereby automatically permitting fuel pressure build-up on the outlet side of the pump to compensate for the failing fuel supply, the pressure responsive means being modified in its action by either atmospheric or supercharger pressure so as to produce a substantially even fuel supply for the airplane engine, regardless of the altitude at which the engine operates.

The objects above mentioned and certain other objects and advantages of my present invention will become apparent from the following specification, including the accompanying drawings, it being clearly understood that they are by way of illustration only and are not to be taken as in any manner limiting the scope or spirit of my invention. On the contrary, the scope and spirit thereof are to be limited only by the prior art and by the terms of the appended claims.

Referring in detail to the drawings, wherein like reference characters designate similar parts throughout the several views—

Figure 1 is a diagrammatic representation of a fuel system embodying my invention and including my fuel pressure regulator;

Figure 1a is a diagrammatic view of a fuel pressure switch of Figure 1 showing it in a different control position;

Figure 1b is a similar diagrammatic view showing a further control position;

Figure 1c is a view of a fuel pressure regulator of Figure 1 showing a valve associated therewith in a different position;

Figure 2 is an enlarged vertical sectional view through the fuel pressure regulator of Figure 1;

Figure 3 is a similar sectional view through a modified form of the regulator;

Figure 4 is a further enlarged sectional view through a fuel pressure regulator of the type shown in Figure 2 and illustrating certain mechanical refinements therein, and Figure 5 is a sectional view on the line 5—5 of Figure 4.

On the drawings of this invention, I have shown a fuel system for the purpose of illustrating the environment for a fuel pressure regulator of the type which will be herein specifically described. In such a system, three fuel tanks 1, 2 and 3 may be provided, although obviously a greater or less number may be used without in any way departing from the spirit of my invention. The tanks 1, 2 and 3 are separately connected to a like number of inlets provided in a selector valve 4, the connections being in the form of copper tubes or the like 5, 6 and 7, respectively. A center outlet pipe 8 extends from the selector valve 4 to a fuel strainer 9.

The outlet of the fuel strainer is connected to a cross 10 from which pipes 12 and 13 extend to a fuel pump 14 and a wobble pump 15, respectively. The shaft of the pump 14 is indicated at 16, such shaft being suitably driven from the airplane engine. The wobble pump 15 is operated manually by a lever 17.

The outlet of the pump 16 is connected by a pipe 18 to a switch pressure regulator 19. The outlet of the regulator 19 and the wobble pump 15 are connected by pipes 20 and 21, respectively, to a cross 22.

Fuel from the cross 22 flows through a fuel pipe 23 to an air-vapor eliminator 24. From the air-vapor eliminator a fuel supply pipe 25 extends to a fuel injector or carburetor 26. Fuel in excess of the requirements of the injector 26 is fed through a pipe 27 from the cross 22 to a fuel pressure regulator indicated generally at R. The intake of the regulator R is indicated at 28 and a by-pass outlet is provided for the regulator at 29. The outlet 29 is connected by a pipe 20 to the cross 10.

The air-vapor eliminator 24 has an air-vapor connection at 31 back to one of the fuel tanks, such as 3, above the level of fuel therein. The purpose of this connection is to return any condensed fuel in the eliminated air and vapor to the fuel supply. The air-vapor eliminator 24 and the switch pressure regulator 19 are fully disclosed in my copending application, Serial No. 335,646, filed May 16, 1940, and Patent No. 2,275,472, dated March 10, 1942, respectively. Briefly, the regulator 19 permits passage of fuel at various rates from the pipe 18 to the pipe 20, and at the same time pressure at a substantially constant value is transmitted through a conduit 32 to a fuel pressure switch indicated generally at S. Whenever air instead of fuel is passed through the pressure regulator, the pressure in the conduit drops to an operative value for the switches.

The pressure regulator serves to prevent the maintenance or increase in pressure in the pressure switch during such time when the pump is operating and fuel is not being delivered to the carburetor through the pressure regulator by permitting any air flow from the pump to pass freely through the pressure regulator. The pressure regulator, however, serves to increase the pressure abruptly, as fuel begins to flow through it, which in turn provides rapid action of the pressure regulator, thereby causing the pressure switch to break the selector valve operating circuit while the selector valve is positioned in full registration with the outlet of the fuel tank.

Returning now to the specific structure of the selector valve 4, a suitable housing is provided with three 90° spaced inlets 33, 34 and 35 receiving the discharge ends of the pipes 5, 6 and 7, respectively. Within the casing of the selector valve 4 a truncated conical cavity is provided which receives a cork-faced tapered valve plug 36. The cork facing is indicated at 37. The valve plug 36 is provided with an L-shaped passageway 38 having a short end communicating with the pipe 8 and located coaxially with the valve plug. The L-shaped passageway 38 has a long end disposed normal to the axis of the valve plug such that it may be successively registered with the intake bosses 33, 34 and 35.

For rotating the valve plug 36, I provide a short shaft 39. An extension shaft 40, coupled to the shaft 39 by a coupling sleeve 41 and suitable drive pins, extends rotatably through a control panel 42. A control handle 43 is fixed to the shaft 40 and is provided with a pointer 44 to cooperate with indicia, such as "No. 1, No. 2, No. 3" and "off", indicating that the selector valve connects the fuel pumping system with any tank 1, 2 or 3 or with none of them.

For effecting automatic rotation of the extension shaft 40 and thereby changing the position of the selector valve 4 without attention on the part of the operator, a solenoid operated ratchet mechanism may be provided. The mechanism may consist of a ratchet wheel 45 secured to the shaft 40 and adapted to be rotated in one direction by a pawl 46. The pawl 46 is pivoted to a core operated plunger 47 which in turn is connected with a slidable solenoid core 48. The core 48 is arranged in a solenoid coil 49 so that whenever the solenoid coil is energized the core 48 and the pawl 46 are propelled in a right hand direction for engaging a tooth of the ratchet wheel 45 and thereby imparting clockwise rotation thereto throughout a distance of one tooth. The core 48 is spring returned as by a spring 50, so that when the coil is de-energized the coil 46 will be pulled backwardly and will drop behind the next tooth of the ratchet wheel.

From the constructions of the parts just described, it will be obvious that energization of the solenoid will cause a single tooth advancement of the ratchet wheel. It is desirable, however, that the ratchet wheel rotate 90° in order to shift the L-shaped passageway 38 from one inlet of the selector valve 4 to the next one as, for instance, from the inlet 33 to the inlet 34. To accomplish this result, I connect a toggle switch 51 in series with the solenoid coil 49 and operate the toggle switch by locating its operating lever 52 between a pair of projections 53 on the plunger 47. Accordingly, when the solenoid is energized it will advance the ratchet wheel one tooth and in so doing will swing the lever 52 of the toggle switch 51 to "off" position, so that the spring 50 will return the pawl 46. The return of the pawl effects return of the toggle switch 51 to the "on" position, so that there will be another energization of the solenoid coil, and such cycle will be repeated so long as current is supplied through the switch 51 to the solenoid. The supply of current, however, is automatic and is usually cut off on the quarter turn, as will hereinafter appear.

Also affixed to the extension shaft 40 is a control disc 54. The disc 54 has a plurality of cam lobes 54a, 54b and 54c corresponding respectively to the inlets 33, 34 and 35 of the selector valve 4. The control disc 54 is adapted to cooperate with the switch S, as will be described after I describe the construction of the switch itself.

The fuel pressure responsive switch S is fully disclosed in my copending application Serial No. 353,539 filed August 21, 1940. Briefly, the switch S is composed of a bellows 55 located in a bellows chamber 56. The pressure in the bellows chamber 56 is increased and decreased by pressure in the conduit 32 which, it will be noted, is in communication with the chamber. This is the conduit that extends from the pressure outlet side of the switch pressure regulator 19.

A switch carriage consisting of carriage bars 57 and 58 connected together by slidably mounted tie rods 59 is adapted to be actuated by the bellows 55 through the medium of a stem 60. A spring 61 interposed between the bellows chamber 56 and the carriage bar 58 tends to lift the switch carriage and keep it in engagement with the stem 60. A roller 62 is carried by a two-part spring extended telescoping switch arm 63 pivoted to ears 64a carried by the carriage bar 57. The roller 62 is adapted at times to bridge contacts 64 and 65, as shown for instance in Figures 1a and 1b. The left end of the contact 64 is a V or knife edge to coact with the roller 62 and retain the switch S in either open or closed position when once it has been shifted to either of said positions.

The switch arm 63 is adapted to be engaged at times by a stationary stud 66, as shown in Figure 1a. The switch arm 63 has a cam lobe 67 with which the cam lobes 54a, 54b and 54c are adapted to coact successively during the automatic operation of the selector valve.

The fuel pressure responsive switch S further includes a compensating bellows 68. A supercharger connection 69 communicates therewith. The fuel system shown in Figure 1 includes a supercharger 70 consisting illustratively of a housing and the usual blower blades 71. The housing has an outlet 72 for air under supercharging pressure to the intake of the engine. The supercharger 70 may of course be driven in any suitable manner, such as by a turbine wheel 73 acted upon by exhaust gases discharged through blades 74 from an exhaust pipe 75. The exhaust pipe 75 conducts the exhaust gases from the engine, some of which may be permitted to escape through a by-pass 76 if there are exhaust gases in excess of the requirements for operating the supercharger. The by-pass 76 includes a butterfly valve 77 to regulate the amount of exhaust gases by-passed and the butterfly valve is usually controlled automatically, so as to increase the supercharger pressure above ambient atmospheric pressure which of course decreases with a gain in altitude. The regulation is usually such that the air under supercharged pressure from the discharge pipe 72 remains substantially at sea level pressure, regardless of what altitude the airplane attains. The supercharger connection 69 is connected directly into the pipe 72, so that the interior of the bellows 68 is subjected to the supercharger pressure.

The diagrammatic showing in Figure 1 includes an electrical control circuit for the selector valve operated ratchet wheel 45 controlled by the switch S. A source of current is provided, such as a battery 78. An ignition switch for the engine is indicated at 79. The switch 79 is connected by a wire 80 to the negative side of the battery 78 and a wire 81 extends to the ignition system of the engine in the usual manner. A terminal panel 82 is provided on which is mounted a positive terminal 83, a negative terminal 84 and a control terminal 85. The negative terminal 84 is connected with the ignition switch 79 by a wire 86, so that current is supplied to the terminal panel 82 only when the ignition system is in operation. A wiring arrangement of this character renders the selector valve operating mechanism inoperative any time the engine is not in operation.

The positive terminal of the battery 78 is connected by a wire 87 with the positive terminal 83 of the terminal panel. Current is supplied from the terminal 83 through a wire 88 to the contact 64 of the switch S. Current is also supplied from the terminal 83 through a wire 89 to an indicator light 90. The contact 65 of the switch S is connected by a wire 91 to the control terminal 85. It is accordingly obvious that whenever the roller 62 bridges the contacts 64 and 65, current will be supplied from the positive side of the battery 78 through elements 87, 83, 88, 64, 62, 65 and 91 to the control terminal 85. From the control terminal the current divides, so that part goes through a wire 92 to a test switch 93 of the indicator light 90 and to an electric bulb 94 thereof. The current to the bulb then returns through a wire 95 to the negative terminal 84 and from there to the negative side of the battery. Thus, closure of the switch S automatically energizes the bulb 94. Any time the operator desires to test the indicator light, a push rod 96 may be depressed for closing the test switch 93 which is connected directly across the positive and negative terminals 83 and 84 of the terminal panel 82, with the bulb 94 in series with the test switch.

Closure of the switch S also causes current from the control terminal 85 to flow through a wire 97 to a relay coil 98, returning by way of a wire 99 to the negative terminal 84. Energization of the relay coil 98 causes it to attract an armature 100 of the relay, thus closing the contacts 101 of the relay. Current from the positive terminal 83 is supplied through a wire 102 to the contacts 101, from which it flows through a wire 103 to a selector switch 104. The selector switch 104 is connected by a wire 105 with the toggle switch 51, which in turn is connected by a wire 106 with the solenoid coil 49. The return circuit from the solenoid 49 is through a wire 107 to the negative terminal 84.

From the explanation of the parts just referred to, it is obvious that closure of the switch S, in addition to operating the indicator light 90, operates the solenoid 49 through the medium of the relay R, whereupon the solenoid in conjunction with the toggle switch 51 produces step by step rotation of the ratchet wheel 45 as already described.

Rotation of the ratchet wheel also rotates the control disc 54, the cams 54a, 54b and 54c, of which so cooperate with the switch S that they open the switch at the completion of a quarter turn of the selector valve 4 providing the switch has been moved from the position of Figure 1a to the position of Figure 1b as a result of fuel pressure build-up in the bellows chamber 56 before the selector valve reaches port alignment position.

The fuel pressure regulator R, as shown in detail in Figure 2, consists of a housing 108 having its inlet 28 horizontally arranged to receive the pipe 27 and its outlet 29 vertically arranged to receive the pipe 30. A combination by-pass outlet and valve seat is provided at 109. Normally closed against the seat 109 is a valve plug 110. The valve plug 110 is carried by the lower closed head of a pressure responsive bellows 111. The upper end of the bellows is sealed relative to a closure head 112 on the housing 108.

A spring 113 is interposed between the valve plug 110 and a spring adjusting screw 114. The screw 114 is threaded in the head 112 and suitably packed as at 115 to prevent undesirable leakage. A knurled knob 116 is provided for convenience in adjusting the screw 114 and thereby the tension of the spring 113.

A port 117 is provided in the head 112 in communication with the interior of the bellows 111. A supercharger connection 118 enters the port and extends, as in Figure 1, to a valve 119. The valve 119 has a connection at 120 with atmosphere and a connection 121 with the discharge of the supercharger 70.

In Figure 3, I show a structural modification of the fuel pressure regulator of Figure 2. Certain parts are similar and I have accordingly given them the same reference numerals with the addition of the distinguishing characteristic a. The bellows 111a has its interior, instead of its exterior, responsive to fuel pressure from the pipe 27. The spring 113 is arranged tandem to the bellows 111a instead of within it as in Figure 2. The incoming fuel from the pipe 27 impinges the end of the valve plug 110a instead of flowing in the opposite direction, as in Figure 2. In both forms of the regulator, however, fuel pressure acts upon the bellows so that an increase in pressure tends to open the valve and an increase in pressure from the supercharger connection 118 or 118a tends to close it.

In Figure 4, I show a further and more elaborate modification having some parts similar to Figure 2 and bearing the same reference numerals with the addition of b. In addition to the showing in Figure 2, the lower head of the bellows 111b has a peripheral flange 122 guided in a tubular guide member 123. The guide member 123 has a flange 124 for supporting it interposed between the housing 108b and the head 112b. The spring 113b has associated therewith an adjusting nut 125. The nut 125 is vertically slidable and non-rotatable within a sleeve 126 depending from the head 112b and having opposite slots 127 receiving arms 128 extended from the periphery of the nut 125. The nut 125 has threaded therein a stem 129 provided with an enlarged part 130 and a reduced part 131. The part 130 is journaled in a bearing 132 in the head 112b. The part 130 extends through a cover plate 132 and has secured thereto an operating knob 133. Whenever the knob 133 is rotated, the threaded rod 129 is likewise rotated for changing the adjustment of the spring 113b.

For indicating the degree of adjustment of the spring, I provide an indicating dial 134 rotatable on the stem portion 131 of the adjusting screw. The dial 134 is provided with suitable indicia which may be read through an opening 135 of the cover plate 132. The dial 134 has secured thereto a gear 136 with which an idler pinion 137 meshes. The pinion 137 is fixed to an idler gear 138 and the idler pinion and idler gear are rotatable on a stud 139 extending from the head 112b. The idler gear 138 in turn meshes with a pinion 140 secured to the adjusting stem 131. This arrangement effects a geared-down rotation of the indicating dial 134 with relation to the rotation of the adjusting rod 129.

Practical operation

In the operation of my fuel system, starting with the parts assuming the position shown in Figure 1, a drop in fuel pressure in the conduit 32 will result from the fuel tank 1 becoming empty and thereby the pump 14 running out of fuel. The tanks 2 and 3, however, are full, as indicated by the liquid level lines 2a and 2b, respectively. Pressure is still up in the bellows chamber 56 of the switch S in Figure 1, but when the fuel pressure fails then the spring 61 will move the carriage 57—58—59 upwardly to the position of Figure 1a, thereby causing the extension 66 to engage the switch arm 63 and move it to circuit closing position. Accordingly, the roller 62 has passed across the knife edge of the contact 64 and bridged it with relation to the contact 65. The circuit is now closed through the switch S, thereby effecting energization of the indicator light 90 and the relay R. The solenoid 49 under control of the relay is accordingly energized and the rotation of the ratchet wheel 45 will commence.

While the lobe 54a of the control disc 54 is rotating a quarter turn clockwise, the cam lobe 54b is coming up to a position of alignment with the switch arm cam lobe 67, as shown in Figure 1b. When the L-shaped passageway 38 of the selector valve 44 begins to register with the inlet 34, the pump 14 will start to pump fuel from the tank 2 to the fuel injector 26. Accordingly, the fuel pressure will be built up in the switch pressure regulator 19 and the pipe 32 and consequently in the bellows housing 56 of the switch S.

This will result in the pressure of the fuel forcing the bellows 55 to collapse against the action of the spring 61, thereby moving the switch carriage from the position of Figure 1a to the position of Figure 1b. Such movement downward of the carriage will occur prior to registry of the cam lobe 54b with the cam lobe 67. When the quarter turn is completed (just after further rotation of the control disc 54 from the position of Figure 1b to the position assumed by the cam lobe 54a in Figure 1), the cam lobe 54b will engage the cam lobe 67, and open the switch to the Figure 1 position. This breaks the circuit at the switch and thereby de-energizes the control terminal 85, which de-energizes the indicator light and de-energizes the relay which in turn de-energizes the solenoid 49. Accordingly the ratchet wheel 45 will stop at the proper position with the L-shaped passageway of the selector valve in exact registry with the inlet 34.

If it so happens that the fuel tank 2 is empty, then of course the fuel pressure will not be built up in the pipe 32 to move the switch carriage from the position of Figure 1a to the position in Figure 1b, with the result that the switch S will remain closed in the position of Figure 1 to permit the cam lobe 54b to pass without opening the switch. Subsequently, the cam lobe 54c will open the switch when the L-shaped passageway 38 is in registry with the intake 35 of the fuel tank 3. Thus the selector valve automatically changes from an emptied tank to a tank in selector valve order having fuel therein.

Due to the ratchet and pawl mechanism 45—46, the selector valve can be manually moved clockwise by the control lever 43 to connect with any desired fuel tank. If at any time the operator wishes to render the automatic selector valve operating mechanism inoperative, he can do so by opening the selector switch 104.

The spring 61 of the switch S may be set at the desired value for proper closing of the switch S on downward shifting of the switch carriage, as in Figure 1b, in accordance with the desired low and high fuel pressures effective in the cavity 56. Where an aircraft in which my system is installed is equipped with an engine having a supercharger that controls the supply and pressure of air to the intake of the engine, the pressure required to deliver fuel to the injector remains substantially constant, due to the action of the fuel pressure regulator R, as the aircraft continues to gain altitude. Air pressure against the inside of the bellows 55, however, steadily decreases. It naturally follows that the aforesaid decrease in air pressure tends to collapse the bellows 55.

Should only the spring 61 resist the aforesaid collapse of the bellows 55, premature downward movement of the switch carriage would result. To prevent such premature movement, the bellows 68 is directly fluid-connected through the pipe 69 with the induction system of the supercharged engine, as by connection into the pressure supply pipe 72 thereof. This effects complete compensation for the fuel pressure increase above mentioned. Such compensation is a result of the supercharger maintaining a substantially constant pressure (for instance sea level pressure) on the air supplied to the engine, regardless of the altitude to which the airplane ascends. Accordingly, by having the connection at 69, the constant air pressure supplied by the supercharger will also maintain a substantially constant pressure inside the bellows 68. This results in a tendency to produce upward movement of the switch carriage, whereas the reduced ambient pressure acting inside the bellows 55, as above pointed out, tends to produce downward movement thereof. Accordingly, constant fuel pressure within the bellows housing 56 surrounding the bellows 55 and constant supercharger pressure within the bellows 68 balance each other to prevent movement of the switch carriage as long as fuel is supplied to the fuel pump. Ambient air pressure tending to collapse the bellows 55 and expand the bellows 68 causes a further balance, resulting in the desired compensation. The result is that movement of the switch carriage is accurately in response to changes in the fuel pressure to give the desired operation to the switch, which in order to operate the selector valve properly must respond to fuel pressure failure as reflected in a drop of fuel pressure when the pump runs out of fuel.

Before proceeding with a description of the operation of the fuel pressure regulators of Figures 2, 3 and 4, I wish to point out limitations in many existing fuel delivery systems. Most fuel pressure regulators are of the conventional "ball and spring" type, or equivalent, such devices being commonly termed "pressure relief valves," and connected between the outlet and the inlet sides of the fuel pump. Assuming an aircraft having its fuel tanks located well below the level of the fuel strainer 9, and an engine in which there is no supercharger; and further assuming that the conventional pressure relief valve mentioned above is set at approximately three pounds per square inch, then when the aircraft takes off it will maintain a steady increase in altitude. Under such conditions, as the atmospheric pressure upon the top surface of the fuel tank diminishes, the magnitude of the suction necessary to raise the fuel into the fuel pump steadily increases. If climbing is continued to an altitude of between 23,000 and 28,000 feet, the vacuum type of fuel pump will have reached its maximum suction capacity and there will be no further fuel delivery.

However, long before any such altitude can be reached, steady climb of the aircraft will have increased the approximately one-half pound per square inch suction required for ground transfer of fuel from tank to pump to a magnitude equal (though opposite in sign) to the positive fuel pressure of three pounds per square inch maintained by the conventional fuel pressure regulator. Thereafter, no further increase in the magnitude of the suction required to transfer fuel from tank to pump can occur because of continuous pressure by-passing set up at this point by the conventional fuel pressure regulator. The by-passed fuel will pass through the pressure relief valve to its limit, after which the residue passes on to the engine. Obviously, further increase in altitude will terminate fuel flow through starving of the fuel pump. I have personally experienced just such an engine failure during flight test of an existing fuel system of the character above referred to.

Also, in existing fuel systems which incorporate the above limitations, there is a second operating factor which may cause engine failure. If, through human or mechanical defect, the receiving end of a selector valve passageway fails to correctly register with the delivery end of a selector valve inlet pipe, thus introducing a restriction to fuel flow from tank to pump, an increase will occur in the magnitude of the suction necessary to raise the fuel into the pump. Such a restriction to fuel flow may readily assume proportions causing a duplication at ground level or shortly after take-off, of the hereinabove described continuous pressure by-passing at the fuel pump. I now propose to disclose how my types of fuel pressure regulators overcome the limitations presented in the two types of existing systems above described.

First of all, assuming the valve 119 vented to atmosphere, as in Figure 1c, I will describe my fuel pressure regulator in connection with an un-supercharged engine. For such an engine, the bellows 68 of the switch S is also vented to atmosphere instead of having a supercharger connection, such as at 69.

With starting of the engine, if a fuel pressure of three pounds per square inch is to be maintained in the pipe 25 to the fuel injector, the adjusting knob 116 must be so set that upward pressure on the mean base area of the bellows 111 is exactly counteracted by the combined downward pressure of suction on the valve plug 110 and compression of the spring 113. Upon accomplishment of the aforesaid setting, let it be assumed that the aircraft takes off and maintains steady increase in altitude.

As the one-half pound per square inch suction required for ground transfer of fuel from tank to pump steadily increases with increasing altitude, the original sea level atmosphere pressure within the interior of the bellows 111 undergoes like pressure decrease, due to its direct communication with atmosphere. The two opposing pressures merely nullify one another (i. e., mere increase in altitude has no regulatory effect upon the seating of the valve plug 110).

On the other hand, any fuel pressure in excess of three pounds per square inch introduced into the housing 108 by the pipe 27 will cause immediate unseating of the valve 110 through upset of the combined downward pressure of the spring 113 and the initial or ground suction on the valve plug 110. I desire to note in passing that by usage of a Venturi shape for the valve seat 109, I am able to use a smaller orifice to pass a given volume of fuel without unduly increasing the pressure or suction necessary to maintain its flow. The aforesaid usage of a venturi also tends to create a less turbulent flow and therefore decreases an accumulation of vapor resulting in vapor lock.

When the fuel supplied to the pump is decreased because of higher altitude or an improperly registered selector valve, the reduction in fuel pressure against the outside of the bellows 111 tends to move the valve plug 110 toward closed position, thereby restricting the fuel flow through the by-pass pipe 30 and building the pressure up in the discharge side of the pump. Accordingly, the fuel is first supplied to the injector 26 and the residue returns through the by-pass pipe 30, with the construction of the valve effecting an automatic compensation for any reduction in fuel pressure so as to maintain the fuel pressure as long as there is sufficient fuel to supply the injector. As soon as there is insufficient fuel, then the plug 110 is seated, so that the injector receives any further fuel available, whereas in the existing types of pressure relief valve systems the relief valve is supplied first. Accordingly, my fuel pressure regulator secures a maximum in efficiency of fuel supply and maintenance of fuel pressure.

With respect to an aircraft equipped with a supercharged engine, wherein the supercharger controls the air inlet pressure of the engine fuel injector, the fuel pressure of the engine injector is proportional to the aforesaid air inlet pressure at different given altitudes. Assuming a supercharger providing sea level condition and an initial ground setting of three pounds per square inch for the adjusting screw 114, the fuel pressure increase required in the pipe 27 after the aircraft takes off and steadily increases in altitude is equal to the sum of the initial three pound pressure and the pressure difference between sea level atmospheric pressure and the atmospheric pressure at any then given altitude. To obtain the foregoing fuel pressure increase it is necessary not only that the valve 119 be adjusted to the position shown in Figure 1, but that the interior of the bellows 111 be in constant communication with the induction system of the supercharged engine. As the original ground atmospheric pressure surrounding the air craft lessens in magnitude with continued increase in altitude, the induction system increases in magnitude the initial sea level atmospheric pressure within the interior of the bellows 111. It thus obviously follows that for each pressure increment added to the interior of the bellows, a like pressure increment must be added to the exterior of the bellows by the fuel pump if the whole is to remain in equilibrium.

Considering the modified fuel pressure regulator of Figure 3 in connection with an un-supercharged engine, the starting of the engine (if the fuel pressure of three pounds per square inch is to be maintained in the pipe 27) is had by the adjusting screw 114a set so that upward pressure on the valve plug 110a is exactly counterbalanced by the combined downward pressure of suction on the mean base area of the bellows 111a from the pipe 30 and compression of the spring 113a. Obviously, compression characteristics of the spring are far less in magnitude than those of the spring 113. Upon accomplishment of the aforesaid setting, let it be assumed that the air craft takes off and maintains a stead increase in altitude.

As the one-half pound per square inch suction required for ground transfer of fuel from tank to pump steadily increases, the original sea level atmospheric pressure within the housing 108a undergoes like pressure decrease, due to its direct communication (as in Figure 1c) with atmosphere. There are two opposing pressures acting one within and one without the bellows 102a, which merely nullify one another. Therefore, mere increase in altitude has no regulatory effect upon the seating of the valve 110a. On the other hand, any pressure in excess of three pounds per square inch within the pipe 27 will cause immediate unseating of the valve 110a through upset of the combined pressures of the spring 113a and the initial or ground suction from the pipe 30 within the bellows 111a. Similarly, therefore, the modification shown in Figure 3 will tend to maintain the proper fuel pressure within the pipe 27, the fuel being first fed to the injector and the excess then passed through the by-pass pipe 30.

When the form of invention shown in Figure 3 is considered in connection with a supercharged engine, the valve 119 would be installed as in Figure 1 so that the interior of the housing 108a is in constant communication with the induction system of the supercharged engine. Then, as the original ground atmospheric pressure surrounding the aircraft lessens in magnitude with continued increase in altitude, the induction system increases in magnitude the initial sea level atmospheric pressure within the interior of the housing 108a. It therefore obviously follows that with proper interproportioning of the bellows and valve areas for each pressure increment added to the exterior of the bellows, a like pressure increment must be added to the seated portion of the valve if the whole is to remain in equilibrium.

The form of invention shown in Figure 4 of course operates in the same manner as described in connection with Figure 2.

From the foregoing description, it is obvious that my fuel pressure regulator is so designed that fuel pressure in the pipe 27 tends to act on the bellows 111 and open the valve 110, or on the valves 110a and 110b and open them. On the other hand, suction operative within the by-pass pipe 30 tends to act on the valves to close them, or within the interiors of the bellows 111a and 111b to close the valves 110a and 110b. The supercharger connection to the pressure regulator compensates the regulator for change in altitude, whereas any restriction of fuel supply is first reflected in a reduction of fuel through the by-pass and not to the engine, while the fuel pressure to the engine is substantially constantly maintained as long as there is fuel supplied from the pump in excess of the requirements of the fuel injector as determined by the pressure regulator.

Some changes may be made in the construction and arrangement of the parts of my device without departing from the real spirit and purpose of my invention, and it is my intention therefore to cover by my appended claims any modified forms of structure or use of mechanical equivalents which may be reasonably included within their scope without sacrificing any of the advantages thereof.

I claim as my invention:

1. A fuel pressure regulator for use in a system for dispensing fuel to a supercharged engine including a fuel pump, said regulator comprising predeterminately varying fuel pressure control means, said means being pressure regulated with input connected to fuel pump outlet, with outlet connected to fuel pump inlet and with pressure means connected on one side to the air supply from the engine supercharger and on the other side continuously with the fuel pump outlet.

2. A fuel pressure regulator for use in a system for dispensing fuel to an engine having a supercharger, said system including a fuel pump, predeterminately varying fuel pressure control means, pressure regulated, with input connected to fuel pump outlet, with outlet connected to fuel pump inlet and with pressure means connected on one side with the fuel pump outlet and on the other side to the supercharger, said last means having a predeterminately varying fuel pressure compensating portion in communication with said engine supercharger.

3. A fuel pressure regulator for use in a fuel dispensing system for dispensing fuel to the fuel injector of an engine, said system including a fuel pump with output connected to said fuel injector, said regulator comprising predeterminately varying fuel pressure control means having responsive means regulated from the fuel pump output, with output from said fuel pressure control means connected on one side with the fuel pump outlet and on the other side to the fuel pump input and with pressure responsive means communicating with atmosphere.

4. A fuel pressure regulator for use in a fuel system having a plurality of fuel sources, an engine having a fuel injector, a pump for pumping fuel from said sources to said engine, and a selector valve between said fuel sources and said fuel pump; said fuel pressure regulator having its input connected with the output of said fuel pump, having its output connected to the intake of said fuel pump and having a pressure chamber exteriorly and continuously subjected to the input pressure, a valve seat at the output of said pressure regulator, a valve plug seated thereagainst, spring means tending to effect such seating, said pressure chamber tending to unseat said valve plug by reduction of pressure interiorly thereof.

5. A fuel pressure regulator for use in a fuel system having a plurality of fuel sources, an engine having a fuel injector and a supercharger, a pump for pumping fuel from said sources to said engine, and a selector valve between said fuel sources and said fuel pump; said fuel pressure regulator having its input connected with the output of said fuel pump, having its output connected to the intake of said fuel pump and having a pressure chamber connected with said supercharger, a valve seat between said input and said output of said pressure regulator and located at said output, a valve plug seated thereagainst for closing tendency under action of the fuel flowing into said output, spring means tending to effect such seating, said pressure chamber tending to unseat said valve plug by reduction of pressure in said pressure chamber.

6. A fuel pressure regulator for use in a fuel system having a fuel pump for supplying fuel to a supercharged engine, said regulator providing means for providing substantially constant output pressure therefrom and comprising a fluid chamber having an intake and an outlet, said intake being connected with the outlet of said pump and said outlet being connected with the inlet of said pump, a valve plug between said inlet of said fuel pressure regulator and said outlet thereof and closing toward the outlet, said valve plug being located for closing tendency resulting from fuel flow from said inlet to said outlet, spring means tending to seat said valve plug, a bellows connected with said valve plug and providing a pressure space in said fluid chamber separated from the space therein between said inlet and said outlet, said pressure space tending upon volumetric decrease to open said valve and being connected with said supercharger.

7. A fuel pressure regulator for a fuel system having a fuel pump for supplying fuel to an engine, and comprising means for providing substantially constant output pressure therefrom, said means having an intake and an outlet, said intake being connected with the outlet of said pump and said outlet being connected with the inlet of said pump, a valve plug between said inlet of said fuel pressure regulator and said outlet thereof, spring means tending to seat said valve plug, a bellows connected with said valve plug and providing a pressure chamber in said pressure regulator separated from the space therein between said inlet and said outlet, such space between said inlet and said outlet being continuously subjected to the pressure introduced to said inlet, said pressure chamber tending upon collapse to open said valve and being connected with atmosphere.

8. In a fuel pressure regulator of the character disclosed, a housing, a bellows therein dividing said housing into a pressure chamber and a fuel chamber, said fuel chamber being connected with the outlet and with the inlet of a pump whereby said regulator may by-pass fuel from said outlet to said inlet, a valve seat in said housing between said outlet and said inlet, a valve plug for said valve seat and closing toward said pump outlet, a spring operative on said bellows and valve plug and tending to seat the valve plug relative to its seat, and means for connecting said pressure chamber with a supercharger in opposition to continuous subjection of said pressure chamber to regulator inlet pressure.

9. In a fuel pressure regulator of the character disclosed, a housing, a bellows therein dividing said housing into a pressure chamber and a fuel chamber, said fuel chamber being connected to the outlet and to the inlet of a fuel pump for permitting fuel pressure from said outlet to act upon said bellows within said fuel chamber and to return to said inlet, a valve seat in said housing between said outlet and said inlet, said valve plug regulating fuel flow from said outlet toward said inlet, a spring operative to seat the valve plug relative to its seat, and pressure means acting upon said bellows within said pressure chamber.

DAVID SAMIRAN.